United States Patent [19]

Willenberg

[11] Patent Number: 4,828,775

[45] Date of Patent: May 9, 1989

[54] CONTINUOUS PROCESS FOR PREPARING HIGH-STRENGTH PROFILES

[75] Inventor: Bernd Willenberg, Bergisch-Gladbach, Fed. Rep. of Germany

[73] Assignee: Bayer Aktiengesellschaft, Leverkusen-Bayerwerk, Fed. Rep. of Germany

[21] Appl. No.: 940,250

[22] Filed: Dec. 10, 1986

[30] Foreign Application Priority Data

Dec. 20, 1985 [DE] Fed. Rep. of Germany ....... 3545457

[51] Int. Cl.$^4$ .............. B29C 55/30; B29C 43/22; B29C 43/24
[52] U.S. Cl. .................... 264/103; 264/165; 264/234; 264/280; 264/290.5; 264/290.7; 264/331.11; 264/345; 264/175

[58] Field of Search .............. 528/190, 191, 593; 264/103, 184, 76.1, 234, 345, 280, 290.5, 290.7, 331.11, 165, 175

[56] References Cited

U.S. PATENT DOCUMENTS 4,337,190  6/1982  Calundann ................... 528/190

*Primary Examiner*—Hubert Lorin
*Attorney, Agent, or Firm*—Connolly and Hutz

[57] ABSTRACT

A process for preparing a profile of thermotropic polymer having a large cross-section, with improved tensile strength and tensile elasticity moduli, comprising first forming a bundle of fibers or filaments of at least one thermotropic polymer and continuously heating the thus formed bundle to a temperature sufficient to form an anisotropic melt and then passing the anisotropic melt through a shape-giving unit.

5 Claims, No Drawings

CONTINUOUS PROCESS FOR PREPARING HIGH-STRENGTH PROFILES

The invention relates to a continuous process for preparing profiles, for example strands, pipes, U- and T-profiles, from thermotropic fibres or filaments.

"Thermotropic" is applied to substances which form liquid-crystalline melts. Thermotropic polymers are sufficiently wellknown, cf. for example F. E. McFarlane et al., Liquid Crystal Polymers II, Contemporary Topics in Polymer Science, Vol. 2, Plenum Publishing Corporation, 1977; W. J. Jackson and H. F. Kuhfuss, J. Polymer Science, Polymer Chem. Ed. 14, 2042 (1976); W. C. Wooten et al., in A. Ciferri "Ultra-high Modulus Polymers", Applied Science Publ., London 1979, page 362 et seq.; A. Blumstein et al., "Liquid Crystalline Order in Polymers", Academic Press 1978; J. Preston, Angew. Makromol. Chem. 109/110, pages 1–19 (1982); A. Cifferri, W. R. Krigbaum, R. B. Meyer "Polymer Liquid Crystals", Academic Press, New York, 1982; P. J. Flory, I. Uematsu, S. P. Papkov, CH. Ober and R. W. Lenz, Advances in Polymer Science 59 (1984); B. Wunderlich, J. Grebowicz, M.G. Dobb, J. McIntyre, H. Finkelmann, G. Rehage, V. P. Shibaev and N. Plate, Advances in Polymer Science 60/61 (1984); EP Nos. 1,185, 1,340, 8,855, 11,640, 15,856, 17,310, 18,145, 18,709, 22,344, 44,205, 49,615; U.S. Pat. Nos. 3,991,013, 3,991,014, 4,066,620, 4,067,852, 4,083,829, 4,107,143; U.S. Pat. Nos. 3,991,013, 3,991,014, 4,066,620, 4,067,852, 4,083,829, 4,107,143; WO 79/797, 79/1,034, 79/1,040.

The liquid-crystalline state of polymer melts can be studied by means of a polarization microscope. For the studies the eyepiece is equipped with an attachment which contains a photodiode arranged in the focal point of the eyepiece lens. By means of a downstream measurement amplifier with regulating means, the value measured with the switched-on microscope when the Nicol prisms are parallel in the absence of a material sample is adjusted to 100 scale divisions. When the Nicol prisms are crossed a value of 0.01 scale divisions results.

The film thickness of the polymer melts studied is 100 $\mu$m.

The polymers are studied after melting the samples at temperatures between 200° and 400° C. If within this whole range or in a part thereof the melt observed between the crossed Nicol prisms is observed to become bright, the polymer is classified as thermotropically liquid-crystalline.

The liquid-crystalline polymers exhibit in the measuring arrangement values over 1 scale division, usually values of 3 to 90 scale divisions. In the case of amorphous melts, for example aromatic polycarbonates, by contrast, values of less then 0.1 scale division are found.

The above-described method of the thermo-optical test (TOT) is particularly suitable for rapid determination in the laboratory, and in almost all cases gives unequivocal results. In dubious cases, however, it can be advisable to demonstrate the presence of liquid-crystalline components in the melt by means of X-ray wide angle scattering, as described for example in G. W. Gray and P. A. Windsor, "Plastic Crystals, Physico-Chemical Properties and Methods of Investigation", in particular chapter 3, John Wiley & Sons, New York, Sydney, Toronto 1974.

Processes for preparing profiles using thermotropic polymers are known. For instance, EP-A No. 117,098 describes a pultrusion process whereby thermotropic polymers are used as a matrix to impregnate strands of customary reinforcing fibres, such as glass or carbon fibres. In this process, the high fluency of the molten thermotropic polymers is utilized; the melt is applied to the strand of the reinforcing fibres via a crossflow die. Problems with this process are the complete penetration of the fibre strand by the melt and the adhesion between matrix material and reinforcing fibre. Nothing is disclosed about the mechanical properties of the profiles manufactured with this process.

Surprisingly, a process has now been found which permits the preparation of profiles of remarkable strength. It is thus possible, for example, to obtain, without fibre-reinforcement, strengths which in the state of the art could only be obtained by means of glass fibre reinforcement.

The invention provides a continuous process for preparing profiles, characterized in that fibres or filaments of at least one thermotropic polymer are bundled, the bundles are heated to a temperature at which the thermotropic polymer is present in anisotropic melt, and these hot bundles are allowed to pass through a shape-giving unit.

The profiles prepared according to the invention preferably retain tensile strengths of at least 500 MPa, in particular of at least 1000 MPa, and tensile elasticity moduli of at least 35,000 MPa, in particular of at least 50,000 MPa.

Suitable thermotropic polymers which are suitable in the form of fibres or filaments for use in the process according to the invention encompass thermotropic polymers, polyester-carbonates, polyester-amides, polyester-imides, polythiolesters, polyazomethines and thermotropic cellulose derivatives such as for example hydroxypropylcellulose. They are described for example in the literature cited at the beginning, which is hereby incorporated herein by reference. Preferred thermotropic polymers are wholly aromatic polyesters based on aromatic dicarboxylic acids, diphenols, where appropriate branching agents and where appropriate chain terminators.

The individual fibre diameter of the fibres and filaments to be used can be 1 to 100, preferably 5 to 50, and in particular 10 to 30, $\mu$m and the length can be 10 mm to continuous and in particular 50 mm to continuous.

The thermotropic polymers are preferably presented in the form of filament yarn (continuous yarn). The thickness of the strand formed by the yarn must of course correspond to the desired linear density of the profile to be prepared. Accordingly, for a given filament diameter the number of individual filaments present within the strand to be shaped is determined by the required profile cross-section. The strand to be used for the process according to the invention is preferably prepared immediately before the shaping. The strand is prepared by taking the monofilaments or filament yarns off bobbins and, ordered by means of a suitable device, bundling them to give the desired strand. "Ordered" is here to be understood as meaning a state in which the individual filaments are present within the strand in a strictly linear, i.e. stretched and parallel, form, so that each individual filament retains its place in the cross-section of the strand over the entire strand length. It is advisable to maintain a sufficient tension of the strand and in particular a uniform tension of all the individual filaments present in the strand, to ensure this order.

"Melting point" of the thermotropic polymers is to be understood as meaning for the purposes of the invention that temperature at which, in the above-described thermo-optical test (TOT), a liquid-crystalline melt occurs for the last time in the course of the cooling down. In practice the melting point can be determined by continuously reducing the temperature of the melt while observing whether the structure of the brightened areas is still changed by pressure on the sample. The lowest temperature at which the structure of the brightened areas is still changed by pressure on the sample is referred to as the melting point. Below this temperature the structure observed solidifies.

It is advisable to heat the strand to the processing temperature or at least to a temperature which is at most 10° C. below the processing temperature even before entry into the shape-giving tool. The heating-up can be effected for example by a contact-free pass through a furnace or by means of high-frequency alternating fields. The dielectric preheating is of advantage in particular in the case of thick profiles, since it makes possible a rapid and uniform heating-up.

The shape-giving unit must be adapted to the shape of the desired profile. It can consist for example of one or more dies with a conical or trumpet-shaped taper. The ratio of inlet cross-section to outlet cross-section of the die orifices is preferably greater than 1.10. However, this mechanical drawing process is not applicable in very many cases, since the force which is necessary for drawing the fibre strand through the die(s) easily exceeds the breaking strength of the strand at the processing temperature. The tractive force which is necessary is composed of the force which is necessary for shaping the strand and the frictional force of the strand against the die wall. The frictional forces can be reduced by means of suitable measures, such as, for example, by siliconizing the die or lining the die with polytetrafluoroethylene, if permitted by the processing temperatures.

If the tractive force which is necessary for pulling the strand through the drawing die(s) is smaller than than the breaking strength of the strand at the processing temperature, the mechanical drawing process can be used. As a consequence of the requisite tractive forces the strand will always be drawn, i.e. the rate at which the profiles are taken off is greater than the rate at which the strand enters the die. Since the cross-section of the profile decreases in the same ratio, this drawing ratio must be taken into account in the dimensioning of the dies. The advantage of mechanical drawing process is that the drawing leads to improved mechanical properties in the direction of the strand and profile.

Owing to the difficulties with the mechanical drawing process, actively conveying shape-giving tools which take over the transport of the strand during the shaping thereof are preferred.

The requisite forces for the shaping are applied here by the transport mechanism; there is no friction between strand and tool on account of the lack of difference in speed between the surface of the tool and the surface of the strand in the tool.

By means of actively conveying shape-giving tools the speed of the incoming fibre strand and the take-off speed can be the same; drawing as in the mechanical drawing process is then avoided. The transport speed of the actively conveying shape-giving tool will be adapted to the take-off speed.

Suitable actively conveying shape-giving tools are for example heated rolls which are driven in opposite directions and whose surfaces have recesses which, when the rolls are forced against each other, then correspond to the cross-section of the profile to be produced. If, for example, a round profile having a diameter of 10 mm is to be prepared, the shape-giving units used can be pairs of rolls which each have over the entire circumference (at least) one semicircular groove with a radius of 5 mm, which has been located in such a way that, when the two rolls are forced against each other they leave free a circular cross-section having a minimum diameter of 10 mm.

This kind of shape-giving tools also includes combinations of serially connected pairs of rolls whose recesses narrow continuously from roll pair to roll pair until the last roll pair just possesses recesses corresponding to the cross-section of the desired profile. In the case of this arrangement, the planes of the successive roll nips in the transport direction are preferably coaxially twisted relative to one another.

Actively conveying shape-giving tools for the purposes of the present invention also include for example arrangements of rolls of one or more pairs of rolls wherein the resulting internal cross-section in transport direction corresponds precisely to the cross-section of the desired profile.

Preferred actively conveying shape-giving tools are also for example pairs of heated conveyor belts which are arranged in such a way that they leave a gap which preferably narrows in the transport direction, the smallest gap width then corresponding to the thickness of the desired profile.

The number of embodiments of the shape-giving units to be used according to the invention is very versatile, in accordance with the number of possible profiles. The basic solutions specified are to be adapted to the specific purpose analogously.

The shape-giving unit is generally followed by a cooling zone, a take-off device and, where appropriate, a cross-cut device.

In a specific embodiment of the process according to the invention it is possible to take into the shape-giving tool, in addition to the thermotropic fibres, other fibres or filaments whose melting point is at least 10° C., preferably 25° C., in particular 50° C., above the processing temperature. These fibres or filaments which are additionally taken in can be customary reinforcing fibres, such as, for example, glass fibres, C-fibres, metal fibres, aramid fibres. Their proportion can account for up to 75% by volume of the profile.

In all process variants in which the processing temperature chosen is below the melting point of one of the types of filament used, it is possible to dispense with the use of actively conveying shape-giving units and to resort to one or more drawing dies.

In a specific embodiment of the process according to the invention, the strand of thermotropic polymers is sheathed with a knitted tube of higher-melting fibres, such as, for example, glass fibres, and is used in this form in the process.

The processing conditions are to be chosen therein in such a way as to produce homogeneous, preferably porefree profiles. When choosing the parameters temperature, tool geometry (and pressure influenced thereby) and transport speed, it should be taken into account that 1. all the air in the strand can escape, so as to obtain void-free profiles; the density of the profiles obtained is then the same as the density of the pure thermotropic polymers, which can be used to decide the question whether void-free profiles have been formed;
2. the processing temperature is chosen to be sufficiently far above the melting point of the thermotropic fibres and filaments that the melt, under the processing conditions, forms a profile which is free of internal interfaces;
3. the totality of the processing conditions can be chosen in such a way that, under processing conditions, the structure of the thermotropic filaments disappears, so that the thermotropic polymer forms a homogeneous matrix; and in particular
4. the transport speed is chosen in such a way that under processing conditions, a homogeneous profile free of internal interfaces is formed. The thicker the profile to be prepared and the closer the processing temperature to the melting point, the lower the transport speed.
5. The processing temperature is within the existence range of the anisotropic melt, i.e. above the melting point of the polymer, preferably up to 30° C., in particular up to 20° C., above the melting point of the polymer.
6. The transport speed can vary, according to the thickness of the profile to be prepared, between 5 cm/min and 50 m/min.

That the constitution of a profile prepared according to the invention is homogeneous, pore-free and free from internal surfaces can preferably be verified by preparing a microsection or thin ground section (of the profile) which is subjected to an investigation with an optical microscope. In the case of a profile prepared according to the invention, the thermotropic fibres used must no longer be visible, nor must voids, cracks or splits.

The thermotropic fibres and filaments can be heat-treated (solid phase postcondensation) before processing into profiles, for example as described in U.S. Pat. Nos. 4,424,184 and 4,183,895, in order to improve the textile data. The heat treatment process, however, can also be carried out on the profiles prepared with the fibres or filaments, or be combined with the process according to the invention.

The profiles prepared according to the invention are very strong and have a high modulus of tensile elasticity. They are thermoformable, can be welded and make it possible to laminate a plurality of profiles by pressing together to give larger units.

The profiles prepared according to the invention can be used for example for manufacturing anchoring and spring elements, bracing and suspending devices as tension-reducing elements in electrical, microwave and lightguide cable, as reinforcing elements in organic and inorganic matrices, as weldable, laminatable and thermoformable construction material.

EXAMPLE

1. Preparation of a thermotropic polyester yarn:
A heatable 25 l kettle made of V4A steel and equipped with stirrer, nitrogen inlet and distillation attachment was charged with the following substances:
31.2 mol=4.309 g of p-hydroxybenzoic acid,
14.4 mol=2.392 g of isophthalic acid,
2.4 mol=399 g of terephthalic acid,
14.4 mol=1.586 g of hydroquinone,
2.4 mol =447 g of 4,4'-dihydroxydiphenyl,
76.8 mol =7,841 g of acetic anhydride,
5 g of magnesium acetate and
2 g of gemanium dioxide.

After threefold evacuating and subsequent venting with nitrogen, the kettle was heated to 170° C. while nitrogen was passed over at a flow rate of 20 l/h. After 2.5 hours at 170° C. the temperature was raised to 200° C. in the course of 30 minutes, then to 250° C. in the course of 1.5 hours, and then further to 300° C. in the course of 1.5 hours. 300° C. was first maintained for about 1 hour under atmospheric pressure, and the pressure was then reduced to 20 mbar in the course of 1.5 hours. The kettle was vented with nitrogen, and the product was forced out through a bottom valve and granulated.

The polyester obtained had an inherent viscosity of 0.75 dl/g, measured on a sample of 0.5 g of polyester in 100 ml of p-chlorophenol at 45° C.

At above 235° C. to the decomposition temperature an anisotropic melt was observed. The polyester was spun with a spin extruder at a screw and die temperature of 335° C. through a die with 30 holes (hole diameter 0.25 mm, channel length 0.5 mm). The take-off speed was 250 m/minute. The filament yarns obtained had the following properties:
Total linear density: 650 dtex
Tenacity: 6.7 cN/dtex=938 MPa
Elongation at break:2.1% (Tensile test in accordance with DIN 53,835)
Initial modulus: 425 cN/dtex=59,540 MPa 2. Preparation of the profile:
68 bobbins of the filament yarn described above ordered by means of a preguide, were bundled to form a strand having a total linear density of 44,200 dtex. This strand was pulled at a rate of 0.1 m/minute through a 50 cm long hot tube at 235° C., and transported through two serially connected actively conveying of shape-giving tool.

Each shape-giving tool consists of two 20 mm wide chromed stainless steel rolls having a diameter of 50 cm, which each have a semicircular groove with a radius of 1 mm. The two rolls were forced against one another in such a way that a circular recess having a diameter of 2 mm was formed. The rolls were heated to 240° C. and rotated at a surface speed of 0.1 m/minute.

The second shape-giving tool, through which the strand passes immediately on leaving the first shape-giving tool, is twisted relative to the first shape-giving tool by 90° about the direction of the strand. The two shape-giving tools are identical.

After leaving the second shape-giving tool the profile was cooled in a waterbath and dried. The tensile test on the profiles obtained gave the following values:
Tensile strength:953 MPa,
Elongation at break:1.0%:
Modulus of tensile
elasticity:60,150 MPa

I claim:
1. A process for preparing a profile of thermotropic polymer having a large cross-section, with improved tensile strength and tensile elasticity molduli, comprising first forming a bundle of fibers or filaments of at least one thermotropic polymer, where the individual fibers or filaments have a diameter of from 1 to 100 μm and a length of at least 10 mm, continuously heating the thus formed bundle to a temperature sufficient to form an anisotropic melt and then passing the anisotropic melt through a shape-giving unit.

2. Process according to claim 1, wherein the temperature is up to 30° C. above the melting point of the at least one thermotrpic polymer.

3. Process according to claim 1, wherein the temperature is up to 20° C. above the melting point of the at least one thermotropic polymer.

4. Process according to claim 1, including mechanically drawing said anisotropic melt.

5. Process according to claim 1, wherein said shape-giving unit is an actively conveying shape-giving unit.

* * * * *